United States Patent [19]

Bulanda et al.

[11] 4,191,334

[45] Mar. 4, 1980

[54] CABLE TIE

[75] Inventors: John J. Bulanda; John E. Lopata, both of New Lenox, Ill.

[73] Assignee: Panduit Corp., Tinley Park, Ill.

[21] Appl. No.: 899,774

[22] Filed: Apr. 25, 1978

[51] Int. Cl.² ............................................. F16L 33/00
[52] U.S. Cl. ................................. 24/16 PB; 24/81 CC
[58] Field of Search .................. 24/16 PB; 248/74 PB

[56] References Cited

U.S. PATENT DOCUMENTS

| | | | |
|---|---|---|---|
| 2,915,268 | 12/1959 | Wrobel | 24/16 PB |
| 3,102,311 | 9/1963 | Martin | 24/16 PB |
| 3,257,694 | 6/1966 | Litwin | 24/16 PB |
| 3,542,321 | 11/1970 | Kahabka | 248/74 PB |
| 3,654,669 | 4/1972 | Fulton | 24/16 PB |
| 3,731,347 | 5/1973 | Caveney | 24/16 PB |
| 3,981,048 | 9/1976 | Moody | 24/16 PB |
| 4,092,765 | 6/1978 | Joyce | 24/16 PB |

FOREIGN PATENT DOCUMENTS

| | | | |
|---|---|---|---|
| 2360992 | 7/1974 | Fed. Rep. of Germany | 24/16 PB |
| 1229921 | 9/1960 | France | 248/74 PB |
| 1480386 | 4/1967 | France | 248/74 PB |
| 1184274 | 3/1970 | United Kingdom | 248/74 PB |

*Primary Examiner*—Bernard A. Gelak
*Attorney, Agent, or Firm*—Charles R. Wentzel; Richard B. Wakely

[57] ABSTRACT

A one piece cable tie for positioning first and second wires relative to one another comprising spacer means for spacing the first wire a predetermined distance from the second wire, retaining means for releasably retaining the first wire, securing means for securely holding the first and second wires against relative movement and spaced the predetermined distance, and abutment means for tightening the hold of the cable tie about the wires.

6 Claims, 9 Drawing Figures

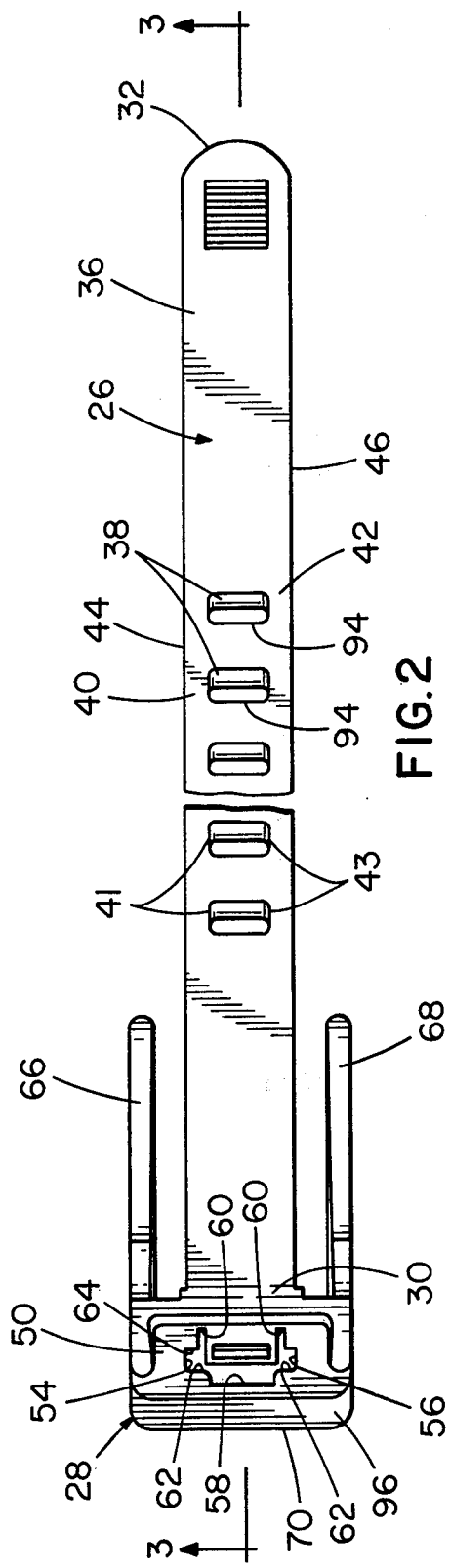
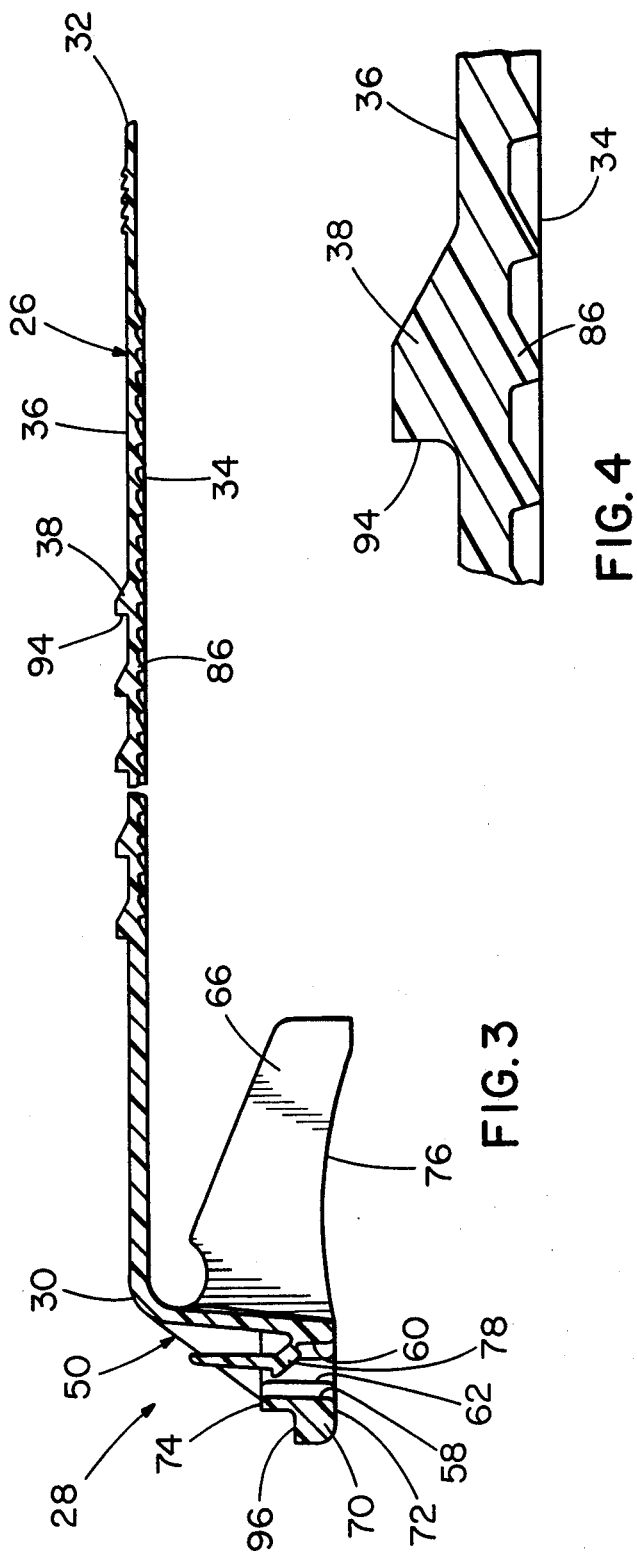

CABLE TIE

FIELD OF THE INVENTION

This invention is related to cable ties for positioning a first object relative to a second object and in particular to a cable tie so adapted and for use as a support tie to securely hold a cable and a support wire against relative movement and spaced from a ground surface.

DESCRIPTION OF THE PRIOR ART

In many bundling applications a user desires a clamping device which permits one elongated member to be held in spaced relation from a second elongated member. For example, hydraulic lines, pneumatic hoses and electrical cables become entangled quite easily and a cable tie device which could securely position these members together in spaced relation would be desirable.

In the communications industry long distances are electrically interconnected by a series of cables having finite lengths connected together at their ends to form a cable of infinite length. This cable is typically routed between spaced poles and installed at elevated locations. The installation is awkward, time consuming and typically requires the active cooperation of expensive ground support equipment (e.g. cranes). Some cables are not structurally capable of supporting their own weight and must be secured to a support wire (e.g. a steel rope). Further, to ensure the quality of the signal transmitted a line amplifier may be required to boost the signal, therefor requiring the cables to be electrically interconnected with interconnection boxes spaced along the route. Cable connectors located on these interconnection boxes dictate that the cable must be bent downwardly from the support wire (i.e. vertically separated) well in advance of the interconnection boxes to minimize the bend radius imparted to the cable. A sharp bend radius could contribute to cable failure. The cable secured to the support wire is subject to the action of wind forces and if the cable is not securely held in place, the cable could either gallop, producing tension forces on the end connections of the cable or rotate and shift relative to the support wire, resulting in grinding forces which tend to wear against the outer insulation of the cable and against the clamping device. Consequently, the cable must be securely clamped to resist motion produced by these forces.

In the past, some installers have utilized a two-piece hanger comprising a longitudinal A-shaped spacer member having a collar extending therefrom suitable for receiving the free end of a cable tie threaded therethrough. The apex of the "A" is urged against the support wire, the cable to be hung urged against the base of the spacer member and the cable tie wrapped around the combination and locked. The two piece tie is complex, requires assembly time and requires increased inventory of parts to be assembled by the user in the field, parts which can be lost or dropped while the installation is being made. Two hands are required to effect the installation. Depending on the cross-sectional diameter of the cable to be secured, the cable tie may not adequately grip the support wire, thereby permitting the combination to rotate relative to the support wire and the support wire to wear against the cable tie and increase the likelihood of cable tie failure.

Another two-piece cable tie device comprises a locking head having first and second strap accommodating openings and a separate strap member having a wedge-shaped head at one end trapped in the first opening. To capture a first wire, the free end of the strap member is threaded over the wire and into the first opening of the locking head from adjacent the top of the first wire member. Upon leaving the locking head, the free end of the strap member must be sharply deflected to ride over the top of a second wire member and threaded into the second opening of the locking head, thereby capturing the second wire. Such a cable tie is excellent for use in tangle-free spacing of two wires of relatively small cross sectional diameter. In applications involving the installation of a cable from a support wire at an elevated location, this cable tie would not be completely suitable in that the strap member would be extremely difficult to thread and would require the use of two hands in order to position the cable tie about the support wire, thereby increasing the difficulty and danger of installation. Further such a cable tie may not adequately grip the support wire and ensure rotation-free engagement. Reference may be had to the U.S. Pat. No. 3,654,669.

Another cable tie device comprises a first strap for engaging a first elongated object, a second strap for engaging a second elongated object, a locking head intermediate of the two strap members and an apertured frame adjacent the free end of the second strap member. After the first strap member has been positioned to encompass the first object and the second strap member positioned to encircle the second object, the free end of the second strap is threaded into the aperture of the frame between the first and second objects and into the locking head, thereby holding the objects in spaced relationship. While such a clamp is generally ideal for two elongated objects of a comparable cross-sectional diameter, this cable tie requires two hands to position the objects to be secured, could not assure the user that a desired separation distance between objects was attained and would neither provide a firm but releasable retention about the first object yet permitting work to continue on the second object nor provide the desired motion-free grip about the objects upon a completed and secured installation. Reference may be had to the U.S. Pat. No. 3,981,048.

Hence a desirable cable tie would be one that is easy to install, permits detachable retention about a first wire while the system is being worked on, is adjustable, permits a compressive enclosure to be easily achieved, provides a separation between the first wire and the second wire and is quickly releasable. In view of the foregoing, one object of this invention is to provide a cable tie which achieves all of the aforesaid.

Yet another object of this invention is to provide an improved strap-type cable tie of simple and reliable construction yet capable of quick installation and release from a work supporting position.

A further object of this invention is to provide a one-piece cable tie for securing one or more work pieces relative to a support wire.

Yet another object of this invention is to provide a cable tie which will securely hold a first object in a constant spaced relation to a second object.

Still a further object of this invention is to provide a support tie which may be quickly installed in place without elaborate advance preparations.

Yet another object is to provide a cable tie which can be positioned and installed using one hand.

Another object of this invention is to provide a cable tie which may be tightened easily.

It is another object of this invention to provide a cable tie capable of achieving a tightened engagement and release therefrom using conventional tools.

Yet another object is to provide a cable tie of unitary construction.

SUMMARY OF INVENTION

The present invention achieves the aforesaid objectives by the provision of a unitary cable tie formed during a molding operation, said cable tie being adapted to securely position a first wire relative to a second wire and comprising spacer means for spacing the first wire a predetermined distance from the second wire, retaining means for releasably retaining the first wire and securing means for securely holding the first and second wires against relative movement and spaced the predetermined distance. The securing means include a flexible longitudinal strap member, a locking head member having a passageway extending therethrough for receiving said strap member and locking means for locking said strap member against retrograde movement once it has been positioned in said passageway. The spacer means includes a leg member having a first surface adapted to engage said first wire and a second surface adapted to engage said second wire, said first and second surfaces being spaced. The retaining means include a stop member extending from one of said first surface and said strap member, said stop member being spaced from the other of said first surface and said strap member less than a cross-sectional diameter of said first wire, said stop member being movable relative to the other of said first surface and said strap member to permit movement of said first wire between said stop and the other of said first surface and said strap member. Abutment means for advancing the strap member relative to said locking head member includes a plurality of projections or lug members having lateral abutment surfaces extending from a surface of said strap member and said locking head member having means for shouldering an applied load, said means for shouldering including a gripping surface, said lug members and said gripping surface defining opposed and spaced gripping means for gripping by a tool having opposed closable jaw members whereby upon applying a force to urge the gripping means toward one another said lug members advance towards the locking head member with the cable tie forming a tight closure. The locking means include means for releasing said strap member from locked engagement, said means for release including a pawl member having a foot member extending therefrom, said foot member having a lateral shoulder suitable for receipt of a disengagement implement such as the head of a screwdriver.

Other objects and advantages of the invention will become apparent upon reading the following detailed description and upon reference to the drawings.

BRIEF DESCRIPTION OF THE DRAWINGS

FIG. 2 is a plan view of the cable tie comprising a strap member and a strap receiving member;

FIG. 3 is an enlarged sectional view taken along line 3—3 of FIG. 2 of the cable tie;

FIG. 4 is an enlarged sectional view taken along line 3—3 of FIG. 2 showing detail of the strap member;

DESCRIPTION OF A PREFERRED EMBODIMENT

Figure 1:
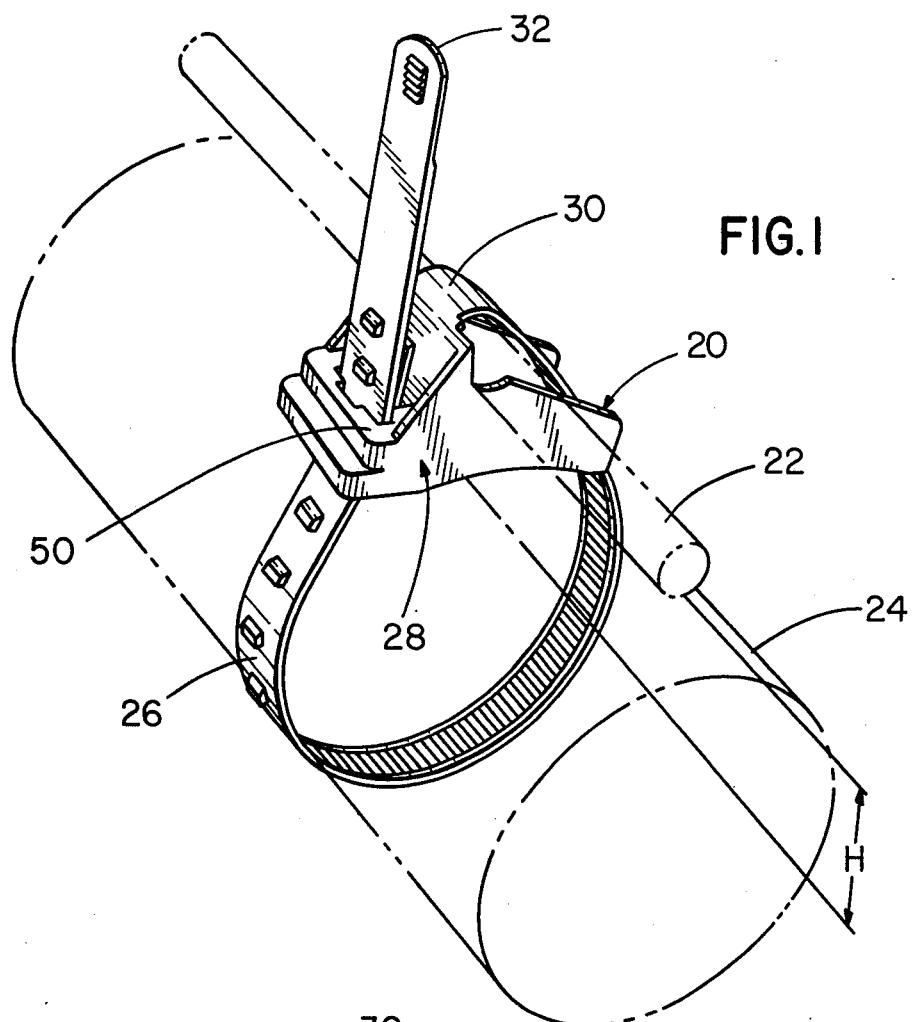
FIG. 1 is a perspective view of a cable tie embodying the present invention adapted to serve as a support tie and provide vertical spacing between a support wire and a cable.

Referring now to the drawings wherein reference characters designate identical or corresponding parts throughout the several views, and more particularly to FIG. 1, there is shown in perspective an integral one-piece cable tie 20 for securely positioning a first wire 22 relative to a second wire 24 (both wires being shown in phantom). The cable tie 20 includes securing means for securely holding the first and second wires against relative movement and spaced by a predetermined distance D. The securing means include a strap member 26, a strap receiving member, shown generally as 28, and locking means for securely locking said strap member from retrograde movement from said strap receiving member. The cable tie 20 is preferably molded from a flexible yet sturdy material, such as a thermoplastic.

The cable tie 20 shown in FIG. 1 is adapted to serve as a support tie and provide a predetermined vertical spacing between a support wire or wires, such as steel rope and represented by the first wire 22 and an electrical cable or bundle of wires, represented by the second wire 24. As such, the discussion which follows will generally refer to a cable tie adapted to space first and second wires apart but will be understood to include applications as a support tie.

Turning now to FIG. 2, cable tie 20 is shown in plan and includes the strap member 26 having opposed ends with one of said ends 30 being connected to said strap receiving member 28 and the other of said ends 32 being free. Strap receiving member 28 includes a locking head member 50 having a passageway 53 for passage of the free end 32 of said strap member 26. A pair of leg members 66 and 68 extend from the strap receiving member, each of said leg members comprising a spacer member being directed in like generally aftward longitudinal direction as said strap member with said strap member occupying an intermediate or forked position relative to the leg members. Although two leg members are shown, one leg member may be sufficient. Passageway 53 includes a pair of opposed substantially flat lateral side walls 54 and 56 and a pair of opposed substantially flat longitudinal walls 58 and 60 having spaced shoulders 62 and 64.

The strap member 26 includes an outer surface 36 having a plurality of longitudinally spaced and aligned projections or lug members 38 having lateral abutment surfaces 94 extending therefrom. Each lug member 38 is generally positioned at an interior section of the strap member outer surface, thereby leaving free margins 40 and 42 defined between lateral edges 44 and 46 of the strap member and edges 41 and 43 of the lug members.

Each of the free margins 40 and 42 are intended to press against and slide on the spaced shoulders 62 of wall 58. The lug members 39 pass unimpeded in a recess formed between the shoulders 62 and the wall 58. Lateral edges 44 and 46 of the strap member generally extend to the spaced side walls 54 and 56 and the free margins 40 and 42 tend to be rail-like in that they permit the strap member to slide against shoulders 62 within passageway 53 when the strap member is advanced.

Referring now to FIG. 3, cable tie 20 is shown in cross-section and said strap receiving member 28 includes the locking head member 50 having a strap member entrance 72 and exit 74, locking means for securely locking said strap member from retrograde movement from said locking head member, said locking means including a pawl member 78 extending from passage wall 60 adapted to cooperate with and engage one of a plurality of laterally serrate ridges 86 disposed on an inner surface 34 of strap member 26 to establish one way ratchet-like closure engagement and means for release, said means for release including a foot member 84 extending from said pawl member having a lateral shoulder 80 suitable for receipt of a disengagement implement. The strap receiving member includes means for shouldering applied loads and includes a ledge member 70 extending therefrom having a gripping or support surface 96.

Spacer means for spacing the first wire 22 the predetermined distance D from the second wire 24 includes said leg members 66 and 68 extending from said locking head member 50 having first edge surfaces 67 and 69 adapted to engage said first wire, second edge surfaces 76 adapted to engage said second wire and third edge surfaces 77 and 79 diametrical to said locking head member 50 defining terminus portions of said leg members, said first and second edge surfaces being generally diametrical and said leg members being substantially planar, free and spaced from said strap member.

Retaining means for releasably retaining the first wire are provided by cooperation between the strap member and the leg members. Strap member 26 extends from the strap receiving member oriented to lie in a plane transverse to said leg members and in a plane disposed intermediate thereto. At a location adjacent to said strap receiving member 28, the first edge surfaces 67 and 69 of said leg members and the inner surface 34 of said strap member are separated by a distance less than a cross-sectional diameter of the first wire 22, thereby providing an interference fit about said first wire. Stop members 71 and 73 extend from the first edge surfaces 67 and 69 of leg members 66 and 68 to retard egress of said first wire 22 from its interference fit, said stop member, said strap receiving member and said strap member cooperating to define a wire detent recess 75. The wire detent recess 75 may be greater in cross section than the cross sectional diameter of the first wire 22 in order to allow the location of said cable tie to be adjusted relative to the first wire prior to the time the cable tie is firmly secured about the first and second wires. The terminus portions of said leg members (i.e. said third edge surfaces 77 and 79) may be separated from the inner surface 34 of said strap member 26 by a distance greater than the cross-sectional diameter of said first wire to define an entrance throat 88 providing wire guide means for guiding the first wire to the wire detent recess.

Turning now to FIG. 4, a section of strap member 26 is shown as being generally planar and as having a thickness defined by the inner surface 34 and outer surface 36. The inner surface 34 includes a plurality of laterally serrate ridges 86 adapted to be engaged by a tooth of said pawl member. The outer surface 36 includes a plurality of spaced lug members 38 projecting therefrom each lug member including an abutment surface 94. Preferably, each of the lug members would be longitudinally aligned.

Figure 5:
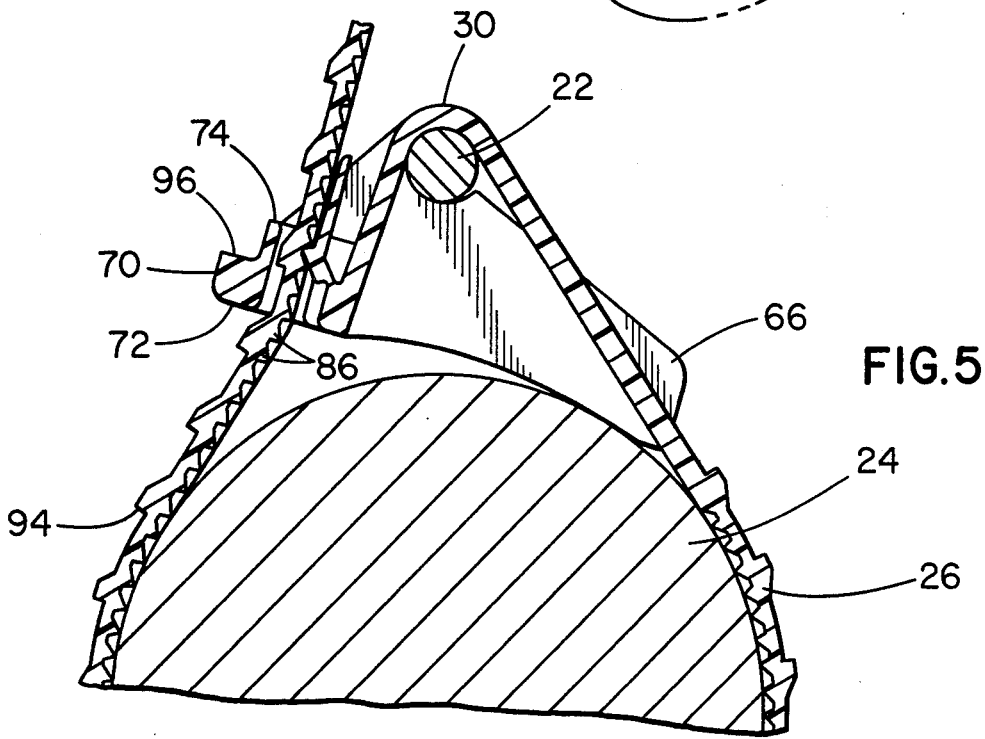
FIG. 5 is an enlarged sectional view, similar to FIG. 1, showing a locked and engaged relation between the cable tie and the retained wires.

Turning now to FIG. 5, an enlarged sectional view of the cable tie 20 includes means for locking the first wire 22 within the wire detent recess 75 and means for advancing the strap member. Enclosure means for locking the first wire 22 within the wire detent and preventing withdrawal of the wire therefrom include a section of said strap member 26 being adapted to contact and be urged against the first wire 22 retained within said wire detent such that as said strap member is passed around the second wire 24 and engaged within said cable tie locking head member 50, said section of strap member is caused to bear against the first wire, whereby the first and second wires are firmly secured together.

Abutment means for advancing the strap member through the passageway of said locking head member, thereby increasing the tension in said strap member and the compressive hold about the wires, includes ledge member 70 having a support surface 96 and lateral abutment surfaces 94 of said lug members 38. The support surface and abutment surfaces defined opposed and spaced gripping means for gripping by a tool having opposed closable jaw members. By applying a force to urge the gripping means toward one another, the spaced lug members are caused to advance towards the locking head member of the strap receiving member, thereby forming a tight closure about the wires.

FIG. 5 shows the various relationships between the cable tie 20 and the retained wires 22 and 24 after the installation is complete and include: the connection and proximate location of strap member 26 end 30 and the strap receiving member 28; the coaction between the first wire 22 and wire detent 75 and the section of strap member 26 causing the wire to be locked within the enclosure; the encircled relation between the first and second wires; and the spaced secured relationship effected between the first and second wires.

Figure 6A:
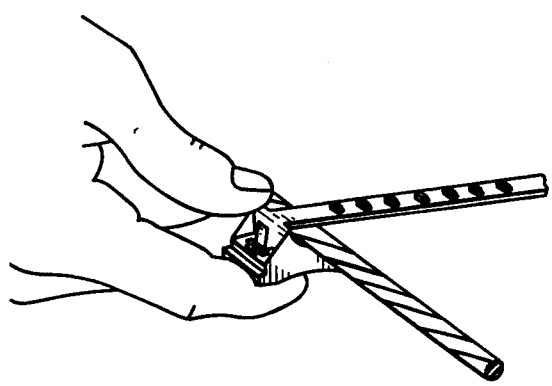
FIG. 6(a)–6(d) are views taken in sequence showing the initial attachment of the cable tie to the first wire, the enclosure formed by the cable tie around the wires, advancement of the strap member and release of the wires from the cable tie.
Figure 6B:
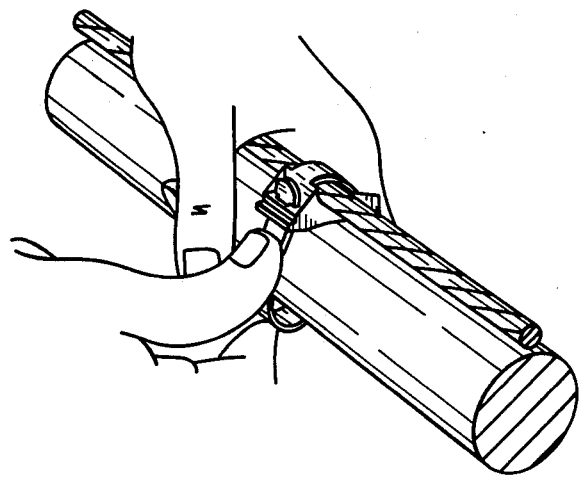
Figure 6C:
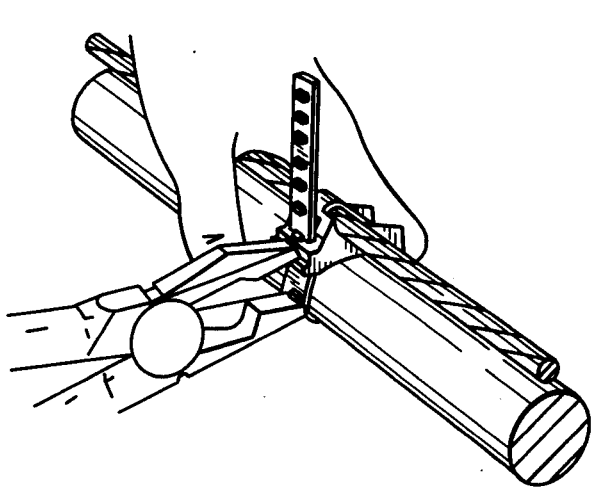
Figure 6D:
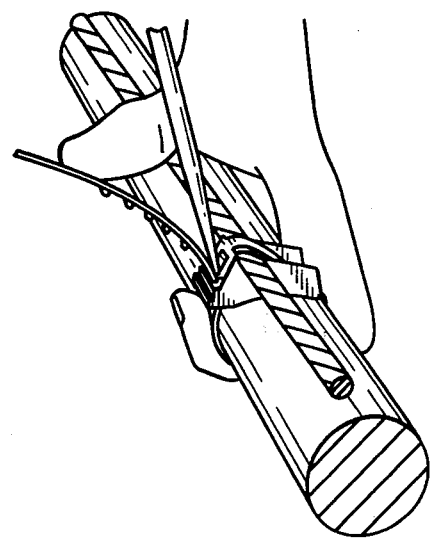

Turning now to FIGS. 6(a) through 6(d) the installation and release of the cable tie is shown. Using one hand, in FIG. 6(a) an installer would first direct the wire entrance throat of the cable tie towards the first wire and urge the cable tie into the wire detent recess. Inasmuch as the cable tie is retained by an interference fit the cable tie may still be removed or its location relative to the wire adjusted. In FIG. 6(b) the second wire is positioned against the leg members of the cable tie and encircled by the strap member, the free end of the strap member being locked against retrograde movement within the locking head of the strap receiving member. The strap member is advanced until the cable tie fits snugly about the second wire. This step causes the section of the strap member proximate to the strap receiving member to lock the first wire within the wire detent. In FIG. 6(c), jaw members of a pair of pliers are brought to bear against the spaced opposed ledge and lug members and urged together, thereby increasing the tension of the strap member and the compressive hold of the cable tie about the wires held therein. When installation is complete, the free end of the strap can be cut off. In FIG. 6(d), the pawl member is disengaged from engagement with a serrate ridge and the cable tie released. As shown, a screwdriver is utilized. The head of the screwdriver is urged against the foot of the pawl member and towards the strap receiving member, thereby disengaging the pawl, releasing the strap member and permitting the wires to be released from the cable tie.

Thus, a support tie (or cable tie) is provided that is unitary in construction, flexible, inexpensive to manufacture, yet a tie which is capable of securely retaining one or more cables, wires, hoses or tubes in a fixed spaced relationship. While a particular embodiment of the invention has been shown, it will be understood that the invention is not limited thereto since, based on the teaching of this invention other embodiments and modifications may be made by those skilled in the art to which the invention pertains upon consideration of the foregoing teachings.

What is claimed is:

1. A one-piece cable tie for attaching one or more elongate objects such as electrical conductors to a support wire, said tie comprising, an elongate flexible strap;

a locking head joined to one end of said strap and including a strap entry face, a strap exit face and a strap-receiving aperture extending therebetween for receiving the other end of said strap, said strap including spaced transverse abutments and said locking head having a locking pawl engageable with said abutments for maintaining a threaded strap in said locking head; and at least one relatively rigid leg extending from said locking head between said strap and said strap entry face with said strap disposed between said leg and said strap exit face, said leg being offset relative to said strap so that said strap can be deflected toward, threaded into and drawn tight in said locking head without interference from said leg whereby said strap formed into a single loop and passed through said locking head holds said objects and said wire spaced from one another by said leg.

2. A tie as set forth in claim 1 which is formed by molding and in which in the as-molded condition of said tie said strap and leg define a recess for receiving said support wire, said strap and leg further defining a constricted throat to said recess which is smaller than the diameter of said support wire whereby the support wire, once inserted into said recess, is retained therein prior to association of said objects and said tie.

3. A tie as set forth in claim 1 comprising a pair of legs extending from said locking head and straddling said strap when the latter is formed into a loop and inserted into said locking head.

4. A tie as set forth in claim 1 wherein said abutments are disposed on the surface of the strap disposed toward the bundled objects, said strap having spaced lugs on the surface of said strap disposed away from the bundled objects, said locking head comprising a load-bearing support surface disposed adjacent said strap exit face so that said strap can be tightened by use of a tool such as a pliers.

5. A tie as set forth in claim 1 comprising a release member extending from said pawl past said strap exit face.

6. A tie as set forth in claim 1 wherein said leg includes an arcuate surface for engaging said objects.

* * * * *